Figure 1:
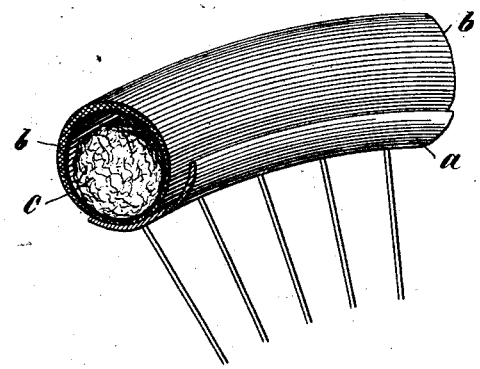

(No Model.)

L. J. PHELPS.
PNEUMATIC TIRE.

No. 472,484.  Patented Apr. 5, 1892.

Attest:
Geo. H. Botts,
C. J. Sawyer

Inventor
Lucius J. Phelps
by
Philipp Munson Phelps
Attys

UNITED STATES PATENT OFFICE.

LUCIUS J. PHELPS, OF PASSAIC, NEW JERSEY.

PNEUMATIC TIRE.

SPECIFICATION forming part of Letters Patent No. 472,484, dated April 5, 1892.

Application filed November 14, 1891. Serial No. 411,934. (No model.)

*To all whom it may concern:*

Be it known that I, LUCIUS J. PHELPS, a citizen of the United States, residing at Passaic, county of Passaic, and State of New Jersey, have invented certain new and useful Improvements in Pneumatic Tires, fully described and represented in the following specification and the accompanying drawings, forming a part of the same.

The object of the present invention is to provide an improved tire of that class now in common use on bicycles and tricycles, consisting of a cylinder of hard rubber or similar material having an air-chamber formed by a tube of softer rubber and known as "pneumatic tires." In the use of such tires, especially when not fully inflated, it is found that the outside of the tire is liable to be compressed so as to force the two opposite walls of the tire together with sufficient pressure to press the particles of the rubber air-tube out from the center of pressure, resulting in a thinning and weakening of the rubber at that point, which may result in a hole. I provide a pneumatic tire by which this difficulty is entirely avoided and which may be ridden with perfect safety when but partially inflated or even when uninflated and collapsed. I attain this result by placing within the air-chamber of the tire a core of some loose yielding material, which will form a cushion within the air-chamber and prevent the two walls of the tube forming the air-chamber coming together on compression. This core may be of any suitable material and of any desired size sufficient for the purpose.

It is evident that many different materials may be used to form the core, it being necessary only that the core should be of some loose yielding material, so as to form a cushion of such a character that compression of the rubber walls of the air-tube against the same shall not result in pressing out the particles of the rubber, as in the case of a dense yielding material—such as rubber—the loose material also affording air-spaces within the core, which is important if the core be made of such a size as to loosely fill or nearly fill the air-chamber, which is preferable. It is preferable, also, that the material should be of sufficient elasticity so that the core will return to its normal form when relieved from compression; but a loose material of small elasticity—such as cotton—may be used. Among the materials fairly well adapted for my purpose are curled hair, small sponges, and cotton waste; but I prefer to form the core of a rope of cotton felt, which may readily be drawn into the tire in the process of manufacture and is found to answer the purpose excellently. With this rope the danger of bunching of the material is avoided, and the ends of the rope being secured together it is held in place in the inner part of the air-chamber, leaving an air-space outside it, so that there is no interference with the action of the air-cushion. It is evident that a similar rope may be formed from other materials—such as hair, sponges, &c., previously referred to—by securing them in a canvas or rubber tube and joining its ends; but the cotton-felt rope is preferred.

Figure 2:
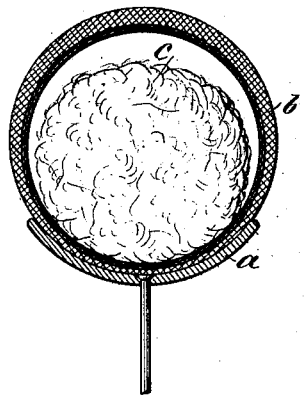
Figure 3:
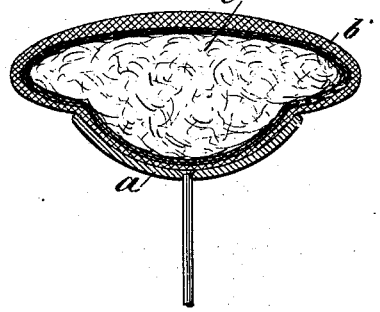

In the drawings forming a part of this specification, and in which I have shown a practical embodiment of my invention, Figure 1 is a perspective view of a small portion of a bicycle-rim with the tire applied. Fig. 2 is a cross-section of the same with the tire fully inflated. Fig. 3 is a cross-section of the same, showing the tire and core compressed.

In the drawings, $a$ is the bicycle-rim; $b$, the pneumatic tire, which may be of any suitable construction and provided with any suitable means for inflation, and $c$ the core, which, as stated above, may be of any suitable loose yielding material and of any size sufficient for the purpose. The core is shown as nearly filling the inflated tire, so as to leave a comparatively small air-chamber between the core and tire; but it will be understood that the core may be of smaller size than shown or fill the inflated tire loosely, the air-spaces in the loose material of the core being then depended on to form the air-chamber, and that the core may be loose in the air-chamber, as shown, or be secured to the inside of the tire. If the core be secured to the tire, the elasticity of the latter may be used to return the core to its normal form after compression and non-elastic material be used for the core. By securing the core to the inside of the tire the material of which the cushion is formed is secured so as to be held in place and bunching prevented, as previously described in connection with the preferred construction of a rope having its ends united. The core and fully-inflated tire are shown in Figs. 1 and 2. On the compression of the tire the core is compressed, as shown in Fig. 3, and it is evident that it thus forms a cushion, preventing the walls of the air-tube being pressed together and enabling the tire to be used safely even when uninflated.

While I have described my improved tire as applied to a bicycle, it will be understood that its use is not limited thereto.

What I claim is—

1. A pneumatic tire having a cushion of loose yielding material secured in place to prevent bunching and partially filling the air-chamber, substantially as described.

2. A pneumatic tire having a cushion formed of a rope of loose yielding material extending through and partially filling the air-chamber and having its ends united, substantially as described.

In testimony whereof I have hereunto set my hand in the presence of two subscribing witnesses.

LUCIUS J. PHELPS.

Witnesses:
 T. F. KEHOE,
 C. J. SAWYER.